US011318838B2

(12) United States Patent
Kita et al.

(10) Patent No.: US 11,318,838 B2
(45) Date of Patent: May 3, 2022

(54) ACCELERATION DEVICE

(71) Applicant: DENSO CORPORATION, Kariya (JP)

(72) Inventors: Takuto Kita, Kariya (JP); Yasuhiro Ootaka, Obu (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/338,302

(22) Filed: Jun. 3, 2021

(65) Prior Publication Data

US 2021/0284020 A1 Sep. 16, 2021

Related U.S. Application Data

(63) Continuation of application No. PCT/JP2019/041126, filed on Oct. 18, 2019.

(30) Foreign Application Priority Data

Dec. 20, 2018 (JP) .............................. JP2018-237836

(51) Int. Cl.
   *B60K 26/02* (2006.01)
   *G05G 1/44* (2008.04)
   *G05G 1/38* (2008.04)
   *G05G 5/05* (2006.01)

(52) U.S. Cl.
   CPC ............... *B60K 26/02* (2013.01); *G05G 1/44* (2013.01); *G05G 1/38* (2013.01); *G05G 5/05* (2013.01); *G05G 2505/00* (2013.01)

(58) Field of Classification Search
   CPC .................................................. G05G 2505/00
   See application file for complete search history.

(56) References Cited

U.S. PATENT DOCUMENTS

| 7,717,012 | B2 * | 5/2010 | Kim ........................ | B60K 26/02 |
| | | | | 74/512 |
| 7,908,939 | B2 | 3/2011 | Kim et al. | |
| 10,620,658 | B2 * | 4/2020 | Kadoi ..................... | F16H 21/44 |
| 2009/0157274 | A1 | 6/2009 | Park | |
| 2010/0071500 | A1 * | 3/2010 | Ohtsubo ................. | G05G 1/36 |
| | | | | 74/513 |

FOREIGN PATENT DOCUMENTS

| DE | 10 2009 032 664 | 5/2016 |
| WO | 2020/129377 | 6/2020 |

* cited by examiner

*Primary Examiner* — Vicky A Johnson
(74) *Attorney, Agent, or Firm* — Nixon & Vanderhye P.C.

(57) ABSTRACT

An accelerator device having an organ structure includes: a pad configured to be pressed by a driver; a case configured to be attached to a vehicle body; an inside movable mechanism housed in the case; and an arm that passes through an opening formed in an outer wall of the case and connects the pad to the inside movable mechanism. The arm has a rectangle shape in a cross section. An entire circumference of the opening is surrounded by a protrusion protruding toward the pad. The protrusion includes an upper surface, and the upper surface has an inclination portion that slopes down rightward or leftward, when viewed from the pad.

8 Claims, 11 Drawing Sheets

ACCELERATION DEVICE

CROSS REFERENCE TO RELATED APPLICATION

The present application is a continuation application of International Patent Application No. PCT/JP2019/041126 filed on Oct. 18, 2019, which designated the U.S. and claims the benefit of priority from Japanese Patent Application No. 2018-237836 filed on Dec. 20, 2018. The entire disclosure of the above application is incorporated herein by reference.

TECHNICAL FIELD

The present disclosure relates to an accelerator device of a vehicle.

BACKGROUND

A known accelerator device which has an organ structure is fixed to a vehicle floor in a vehicle interior. The accelerator device includes a pad and a pedal. The pad is configured to be pressed by the driver, and the pedal is housed in a case. An arm passes through an opening of the case and connects the pad to the pedal.

SUMMARY

According to one aspect of the present disclosure, an accelerator device having an organ structure is provided. The accelerator device includes: a pad configured to be pressed by a driver; a case configured to be attached to a vehicle body; an inside movable mechanism housed in the case; and an arm that passes through an opening formed in an outer wall of the case and connects the pad to the inside movable mechanism. An entire circumference of the opening is surrounded by a protrusion protruding toward the pad.

DETAILED DESCRIPTION

Figure 1:
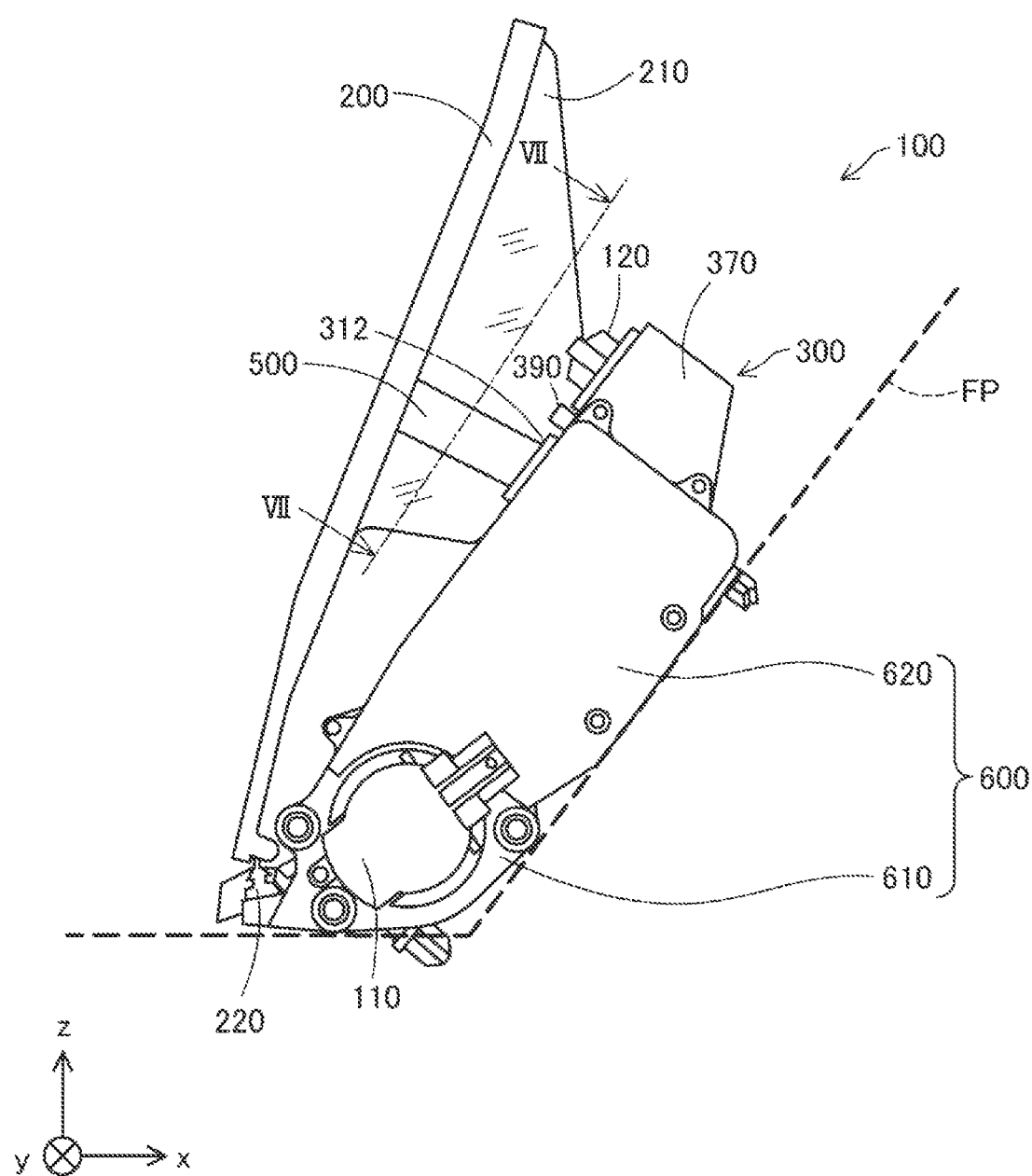
FIG. 1 is a side view illustrating an accelerator device according to an embodiment.

An accelerator device which has an organ structure may be fixed to a vehicle floor in a vehicle interior and detects a depression amount of an accelerator pedal pressed by a driver. The accelerator device having the organ structure includes a pad and a pedal. The pad is configured to be pressed by the driver, and the pedal is housed in a case. An arm passes through an opening of the case and connects the pad to the pedal.

In the above technique, foreign matter may be easily caught in the opening. In addition, a groove may be formed on a side surface of the arm, and the foreign matter may be easily collected between the groove and the opening. Therefore, at least part of the above issue is desired to be solved.

According to a first aspect of the present disclosure, an accelerator device having an organ structure is provided. The accelerator device includes: a pad configured to be pressed by a driver; a case configured to be attached to a vehicle body; an inside movable mechanism housed in the case; and an arm that passes through an opening formed in an outer wall of the case and connects the pad to the inside movable mechanism. An entire circumference of the opening is surrounded by a protrusion protruding toward the pad.

According to the accelerator device in the first aspect, the protrusion is arranged so as to surround the entire circumference of the opening. Therefore, foreign matter is restricted from entering the case through a gap between the opening and the arm.

According to a second aspect of an accelerator device having an organ structure, the accelerator device includes: a pad configured to be pressed by a driver; a case configured to be attached to a vehicle body; an inside movable mechanism housed in the case; and an arm that passes through an opening formed in an outer wall of the case and connects the pad to the inside movable mechanism. The outer wall includes an upper peripheral surface that forms an upper part of a periphery of the opening and faces the pad, when the case is viewed from the pad. An angle between the upper peripheral surface and a side surface of the arm is larger than or equal to 90 degrees.

According to the accelerator device in the second aspect, foreign matter approaching the opening is hit and bounced against the upper peripheral surface of the opening and the side surface of the arm. Therefore, the foreign matter is restricted from entering the case through a gap between the opening and the arm.

According to an accelerator device having an organ structure in a third aspect, the accelerator device includes: a pad configured to be pressed by a driver; a case configured to be attached to a vehicle body; an inside movable mechanism housed in the case; and an arm that passes through an opening formed in an outer wall of the case and connects the pad to the inside movable mechanism. An inner wall surface of the opening faces a side surface of the arm. A gap between the inner wall surface and the side surface of the arm is expanded toward an inside of the case.

According to the accelerator device in the third aspect, when foreign matter is caught in the opening, the foreign matter is moved into inside of the case through the opening by operating the arm. Therefore, the foreign matter is restricted from being stored in the opening.

According to an accelerator device having an organ structure in a fourth aspect, the accelerator device includes:

a pad configured to be pressed by a driver; a case configured to be attached to a vehicle body; an inside movable mechanism housed in the case; and an arm that passes through an opening formed in an outer wall of the case and connects the pad to the inside movable mechanism. The arm includes a side surface without a recess at a position facing an inner wall surface of the opening.

According to the accelerator device in the fourth aspect, as the recess is not formed at the side surface of the arm, when foreign matter is caught in the opening, the foreign matter is moved into the case through the opening by operating the arm. Therefore, the foreign matter can be restricted from being stored at the opening.

Figure 2:
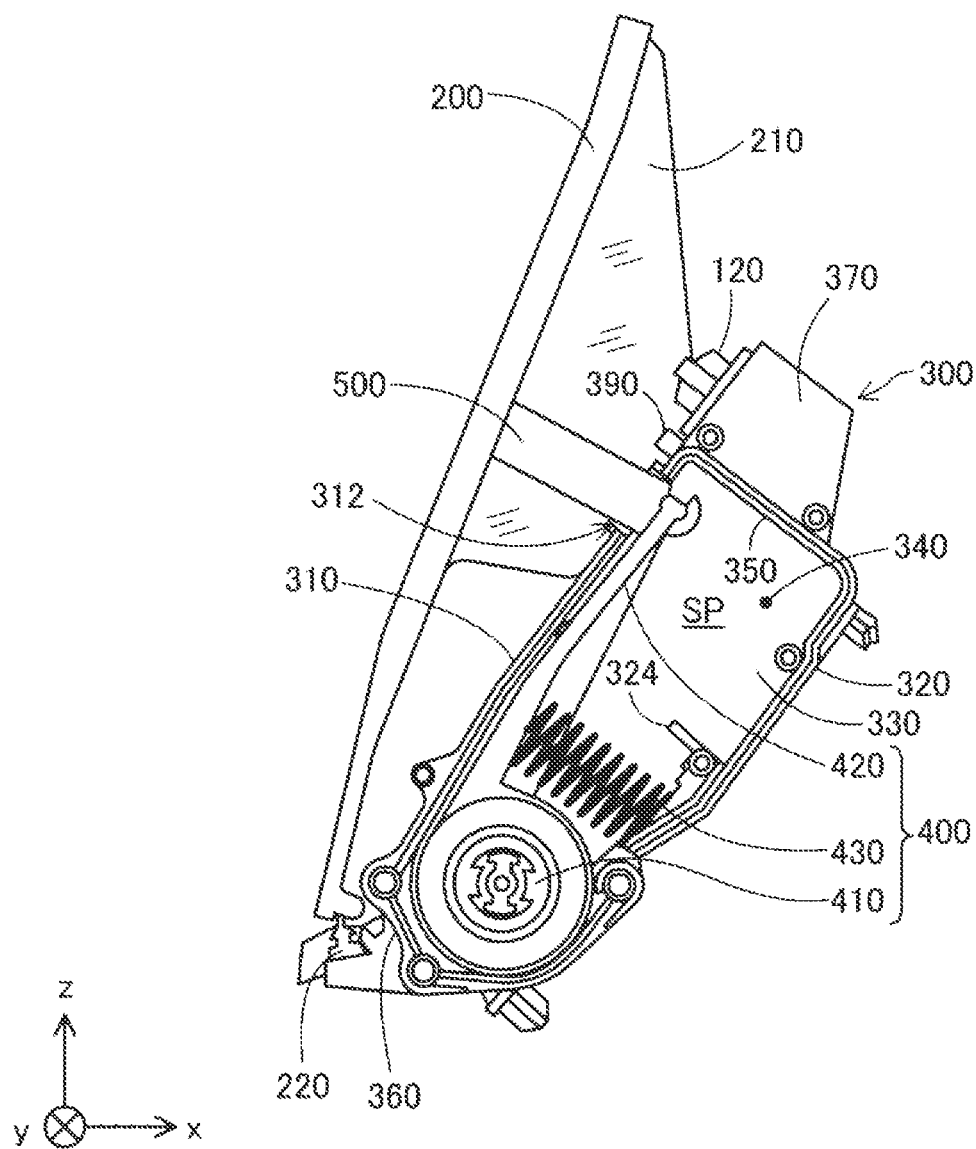
FIG. 2 is a side view illustrating the accelerator device without a cover.
Figure 3:
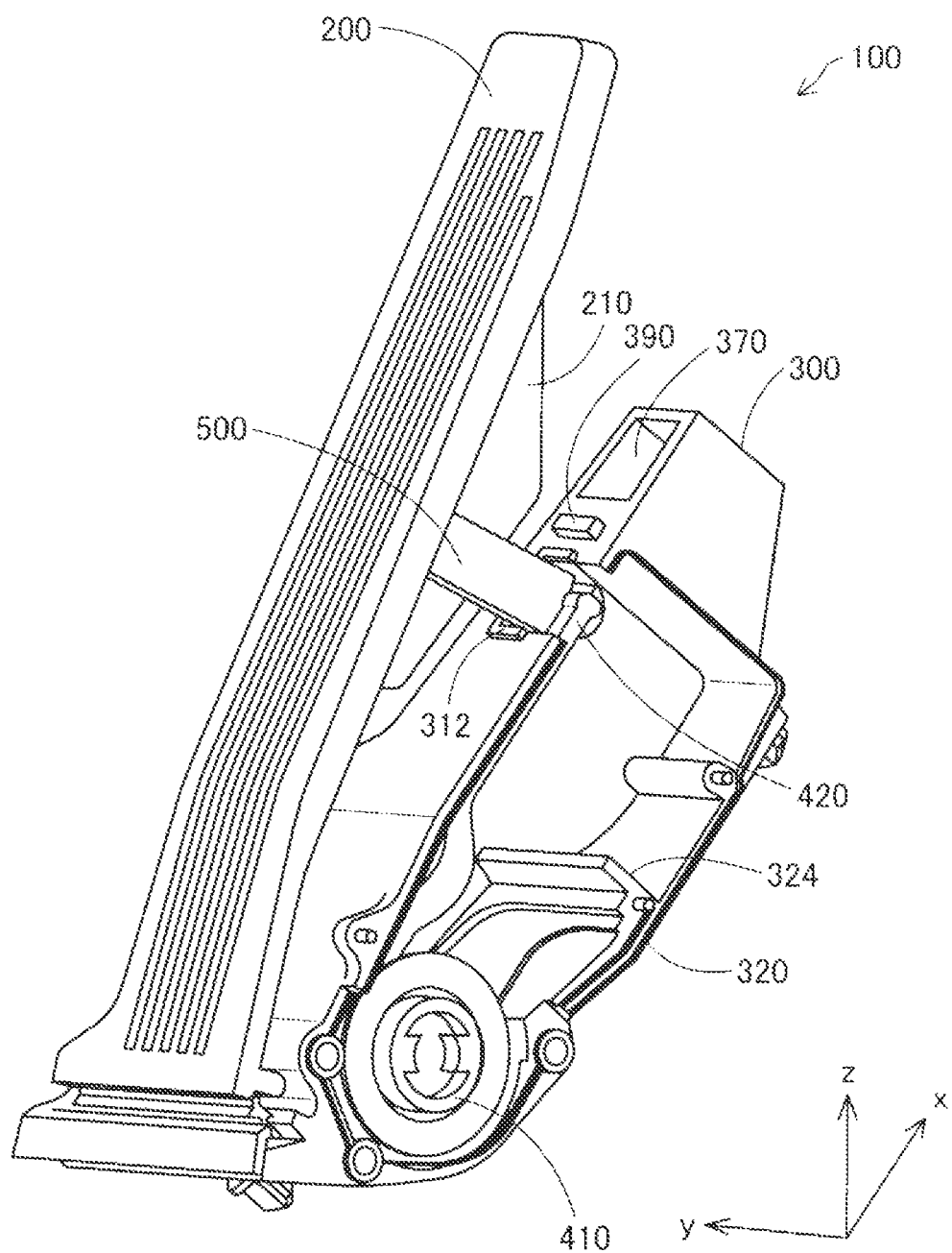
FIG. 3 is a perspective view illustrating the accelerator device without the cover.

A. Overall structure of accelerator device:

As shown in FIGS. 1 to 3, an accelerator device 100 is attachable to a floor panel FP included in a vehicle body of a vehicle. In FIG. 1, x-axis direction coincides with a direction in which the vehicle moves, y-axis direction coincides with a width direction of the vehicle, and z-axis direction coincides with a vertical direction upward. In other drawings which will be described below, x-axis direction, y-axis direction, and z-axis direction are same as those shown in FIG. 1 respectively. Unless otherwise stated, structure or arrangement of the accelerator device 100 in a situation that is installed in the vehicle body will be described below. For example, "upward" or "above" means that upward or above in a situation that the accelerator device 100 is installed in the vehicle body. Other terms and descriptions are same as above.

The accelerator device 100 includes a pad 200, a case 300, an inside movable mechanism 400, and an arm 500. The pad 200 is configured to be pressed by a driver. The case 300 can be attached to the vehicle body. The inside movable mechanism 400 is housed in the case 300. The arm 500 passes through an opening 312 provided in an outer wall of the case 300 and connects the pad 200 to the inside movable mechanism 400. The opening 312 may be referred to as through hole 312. As described above, in the accelerator device 100, the arm 500 connects the pad 200 to the inside movable mechanism 400 housed in the case 300. The pad 200 is arranged on a side of the case 300 to face the driver. The accelerator device 100 structured as above is referred to as an organ type accelerator.

The pad 200 is configured to be pressed by the driver. A side guard 210 has a plate shape and is arranged on a side surface of the pad 200. A lower end of the pad 200 is supported by a fulcrum member 220 disposed at a lower end of the case 300. The pad 200 is configured to turn about a contact point with the fulcrum member 220. The side guard 210 closes a gap between the pad 200 and the case 300 so as to protect the foot of the driver from getting caught between the pad 200 and the case 300.

As shown in FIG. 2, the case 300 includes a front wall 310, a rear wall 320, an opened side 330, a side wall 340, a top wall 350, and a bottom wall 360, as walls which surround an internal housing space SP. The front wall 310 faces the pad 200. The rear wall 320 is opposed to the front wall 310. The opened side 330 forms one of side surfaces of a space between the front wall 310 and the rear wall 320. The side wall 340 is opposed to the opened side 330. The top wall 350 is an upper end of the internal housing space SP. The bottom wall 360 is opposed to the top wall 350. As the opened side 330 is not a wall, the front wall 310, the rear wall 320, the side wall 340, the top wall 350, and the bottom wall 360, except for the opened side 330, function as housing walls which surround the internal housing space SP. As shown in FIG. 1, the opened side 330 is covered and closed by a cover 600. The cover 600 includes a first cover 610 and a second cover 620. In the present embodiment, the first cover 610 and the second cover 620 are separately structured. However, the first cover 610 and the second cover 620 may be combined. As the cover 600 is one of walls forming the internal housing space SP of the case 300, the cover 600 may be considered as a part of the case 300. In this description, "case" in a broad sense includes the case 300 corresponding to a case main body and the cover 600.

The outer wall of the case 300 facing the pad 200 has an opening 312 and a full open stopper 390. The arm 500 passes through the opening 312. The full open stopper 390 is configured to regulate an accelerator full-throttle position by being brought into contact with the pad 200 when the pad 200 is fully pressed. The accelerator full-throttle position is a position at which an accelerator throttle opening is 100%. A position or a structure of the full open stopper 390 will be further described below.

A kick-down switch 120 is arranged on the outer wall of the case 300 above the full open stopper 390. The kick-down switch 120 is configured to detect a kick-down. The kick-down is an operation pressing the pad 200 strongly by the driver to change the gear down at once. A housing chamber 370 is formed at a top of the case 300 and houses the kick-down switch 120. In FIG. 3, the kick-down switch 120 is removed from the housing chamber 370.

As shown in FIG. 2, a screen 324 is arranged on an inner surface of the rear wall 320 in the case 300 and extends obliquely upward from the rear wall 320 toward the front wall 310. When water enters the case 300 from the opening 312, the screen 324 is configured to guide the water to flow through a route avoiding a bias member 430. That is, if the water falls in a vertical direction, the screen 324 restricts the water from directly reaching the bias member 430.

As shown in FIG. 2, the inside movable mechanism 400 includes a shaft 410, a pedal 420, and the bias member 430. The shaft 410 is supported by the case 300 and configured to rotate. The pedal 420 extends obliquely upward from an outer peripheral surface of the shaft 410. The bias member 430 is arranged below the pedal 420 and configured to bias the pedal 420 toward a throttle fully closed state. In the present embodiment, the bias member 430 is a compression spring, however, the other type of a bias member such as a tension spring, a torsion spring, or the like, may be employed to apply force to bias the pedal 420 toward the throttle fully closed state. When the tension spring is employed as the bias member, the bias member is arranged above the pedal 420. When the torsion spring is employed as the bias member, the bias member is arranged to surround a central axis of the pedal 420. As shown in FIG. 1, the first cover 610 covers a lower portion of the opened side 330 in the case 300 corresponding to a side of the shaft 410. The second cover 620 covers an upper portion of the opened side 330 above the first cover 610.

As shown in FIG. 1, an accelerator opening sensor 110 is arranged outside the shaft 410 and configured to generate an accelerator opening signal corresponding to a rotation angle of the shaft 410. In the present embodiment, the accelerator opening sensor 110 includes a detection circuit which includes a Hall element detecting an orientation of a permanent magnet embedded in the shaft 410. However, various types of the accelerator opening sensor other than that explained above are applicable.

Figure 4:
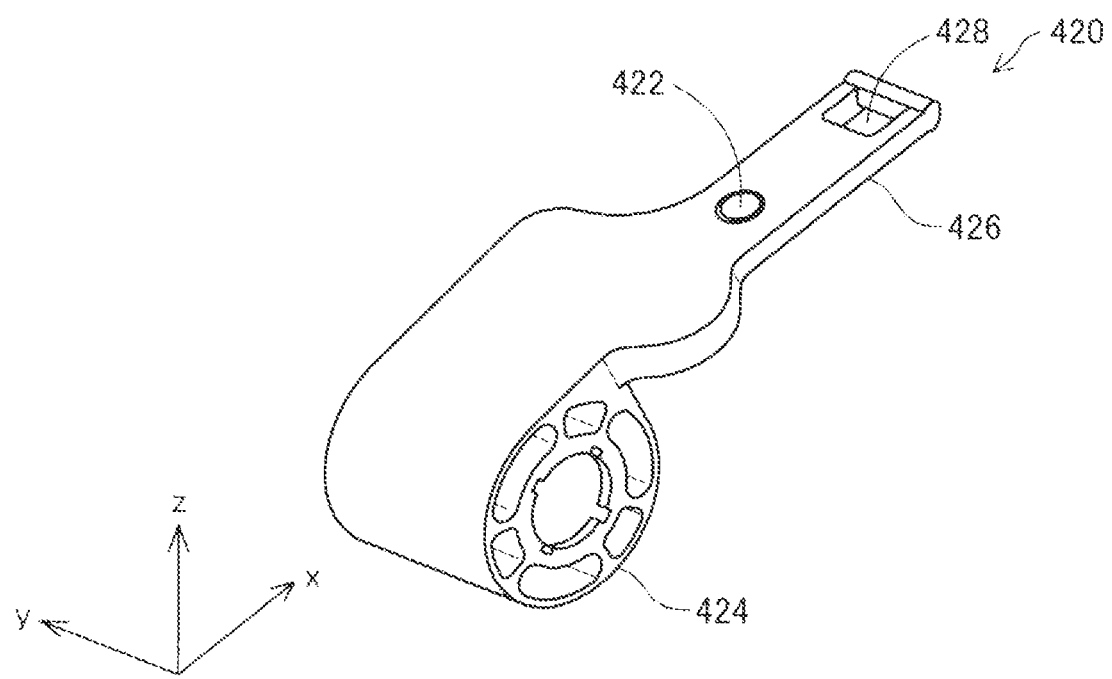
FIG. 4 is a perspective view illustrating a pedal.

As shown in FIG. 4, the pedal 420 includes a cylinder 424 and a pedal extension part 426. The shaft 410 is inserted into the cylinder 424. The pedal extension part 426 extends obliquely upward from the cylinder 424. A position on which the pedal extension part 426 branches from the cylinder 424 is referred to as root of the pedal 420. An engagement hole 428 is provided around an end of the pedal extension part 426 and is engaged with an end of the arm 500. A full close stopper 422 is arranged on an upper surface of the pedal extension part 426 and protrudes from the upper surface of the pedal extension part 426. The full close stopper 422 is configured to regulate an accelerator idle position by being brought into contact with an inner surface of the front wall 310 of the case 300.

Figure 5:
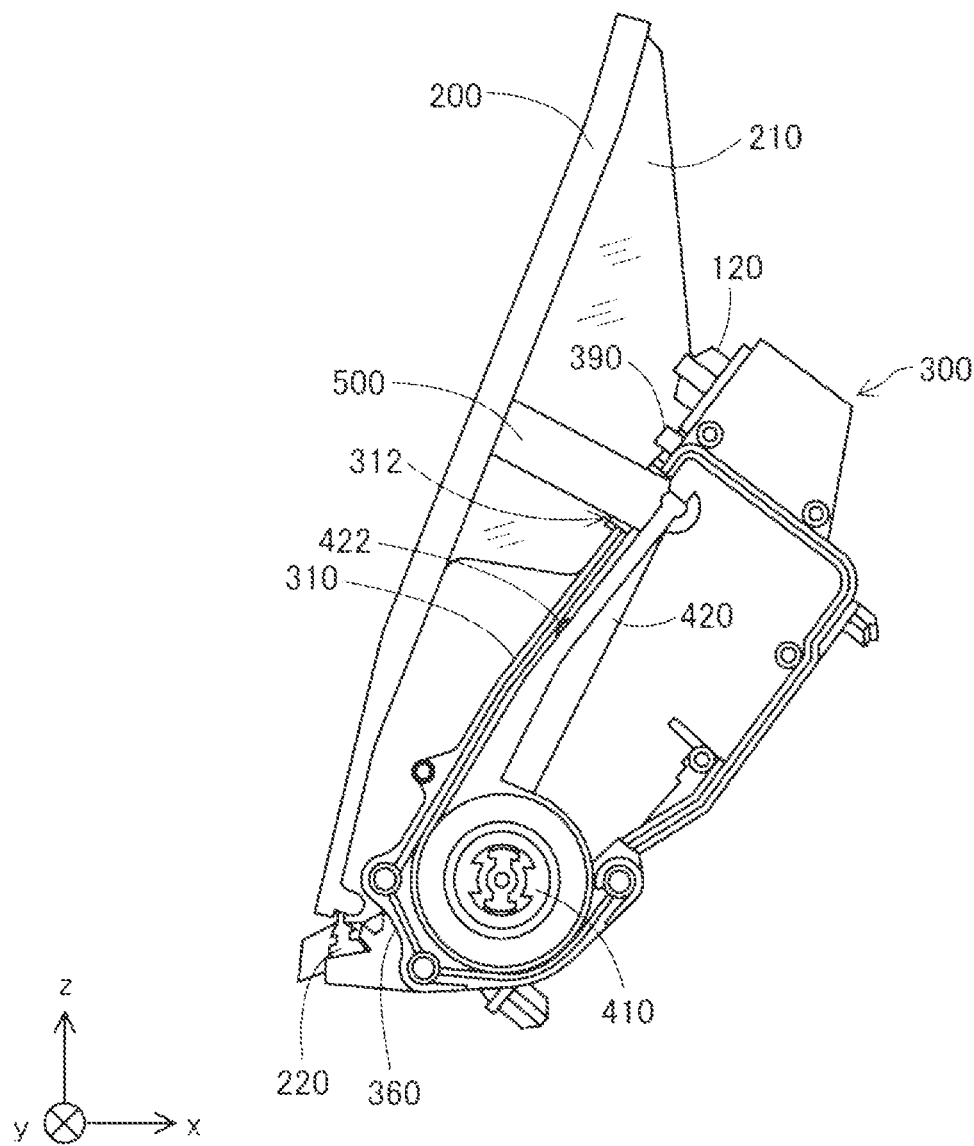
FIG. 5 is a side view illustrating the accelerator device in an idle state.
Figure 6:
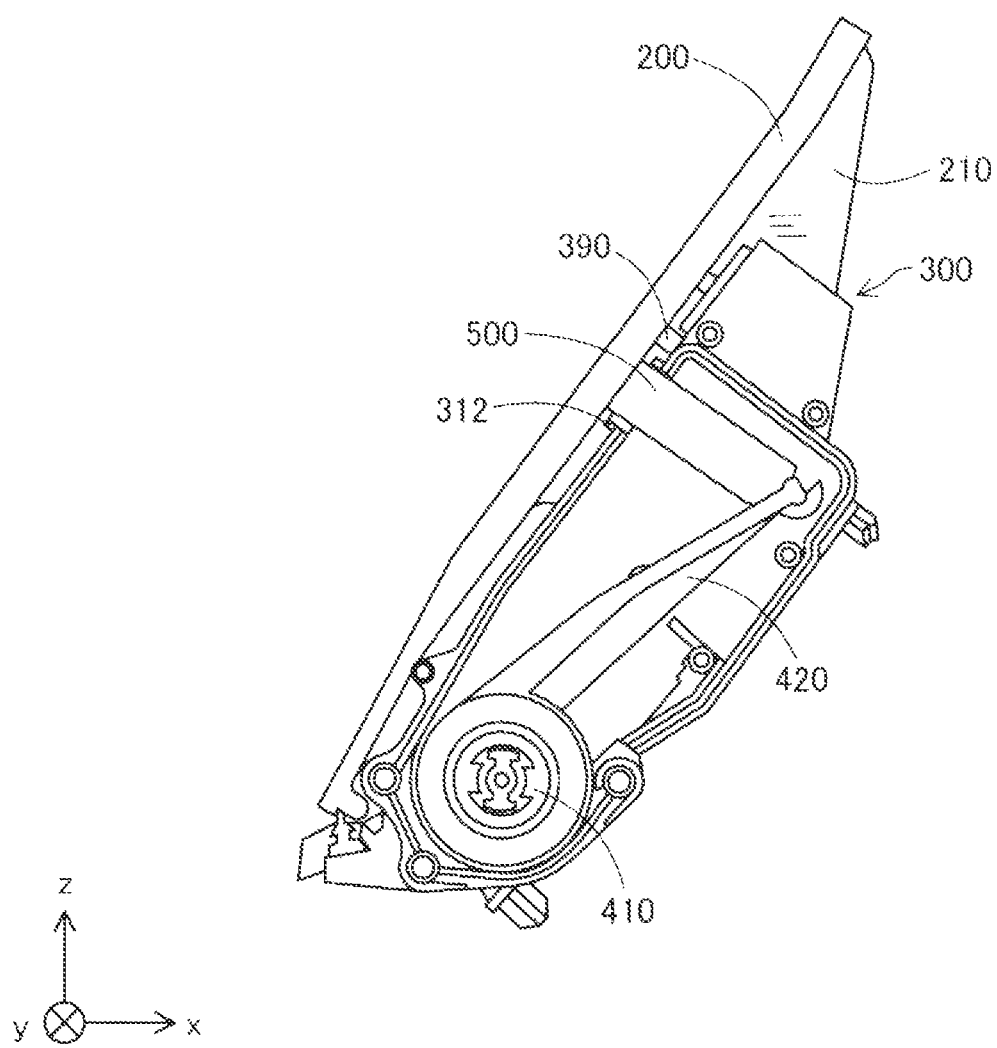
FIG. 6 is a side view illustrating the accelerator device in a full throttle state.

As shown in FIG. 5, in an idle state, the full close stopper 422 of the pedal 420 is in contact with the inner surface of the front wall 310 of the case 300. As shown in FIG. 6, in a full throttle state, the full open stopper 390 on an outer surface of the front wall 310 in the case 300 is in contact with the pad 200.

Components of the accelerator device 100 except for the shaft 410 and a spring of the bias member 430 may be made of resin. An overall structure of the accelerator device 100 described above is one example and a part of them may be arbitrarily omitted. For example, the side guard 210 or the screen 324 may be omitted.

Figure 7:
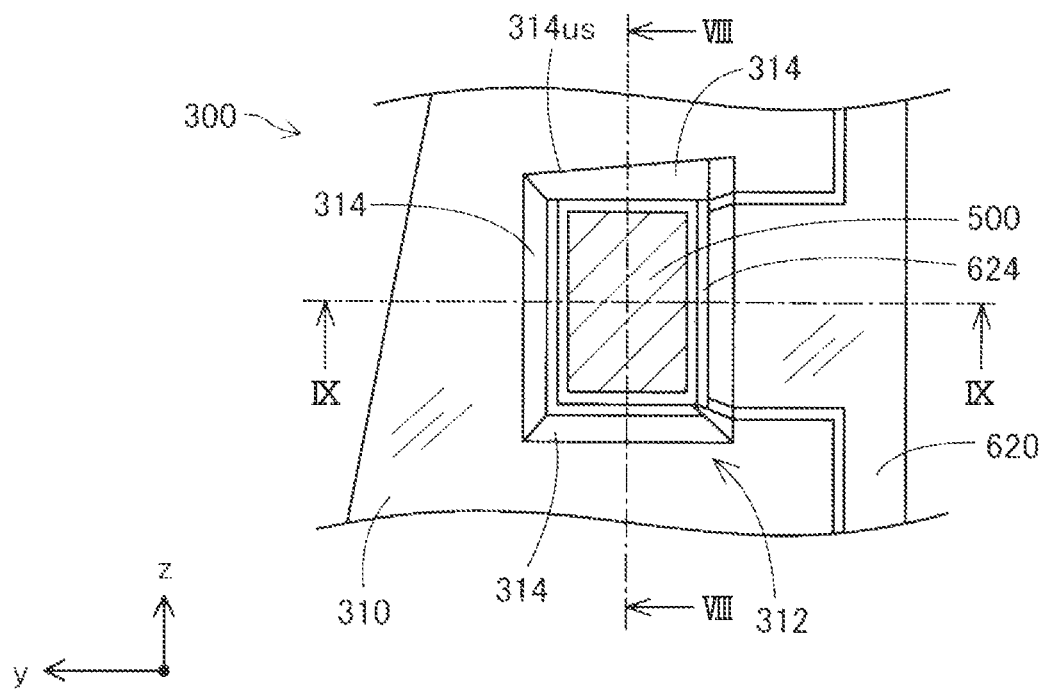
FIG. 7 is a cross-sectional view taken along a line VII-VII in FIG. 1.
Figure 8:
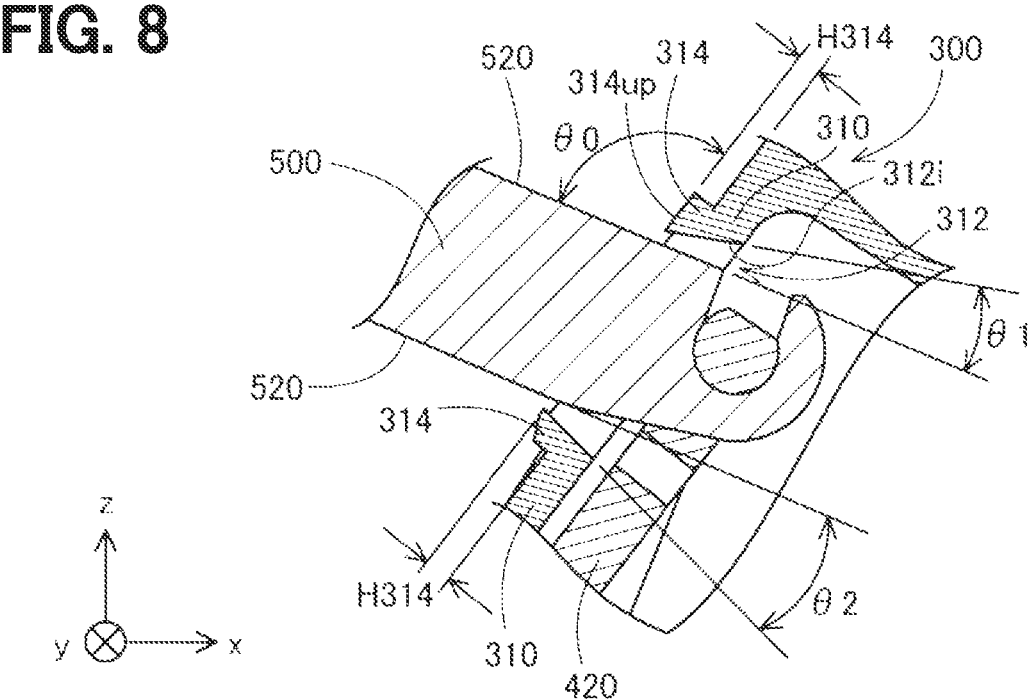
FIG. 8 is a cross-sectional view taken along a line VIII-VIII in FIG. 7.
Figure 9:
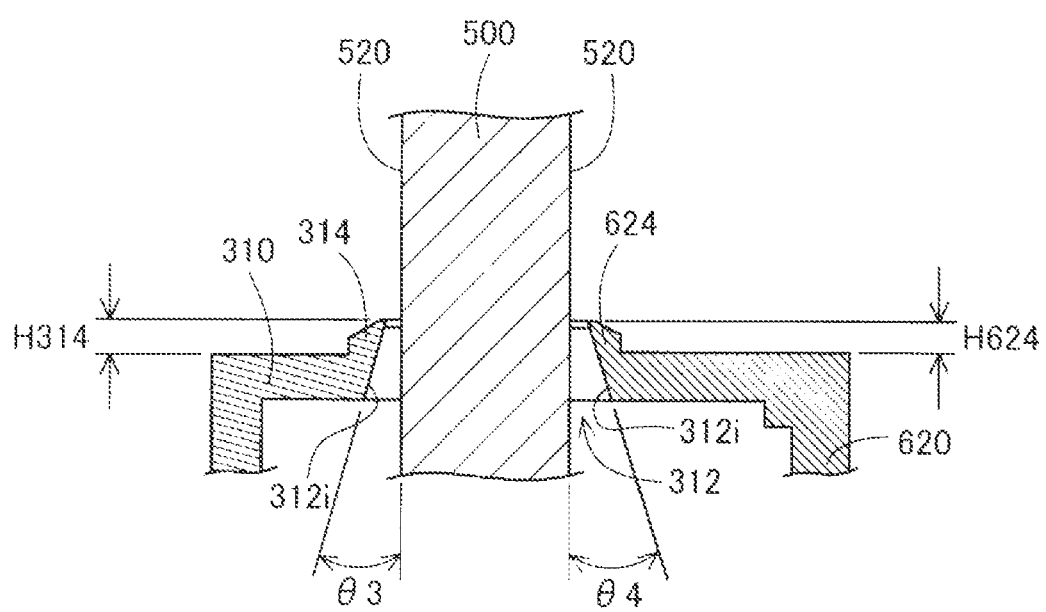
FIG. 9 is a cross-sectional view taken along a line IX-IX in FIG. 7.

B. Various structural examples around opening:

As shown in FIGS. 7 to 9, the case 300 has a protrusion 314 surrounding an entire circumference of the opening 312 and protruding toward the pad 200. As shown in FIG. 7, the protrusion 314 of the case 300 is formed along three sides, among four sides surrounding the opening 312, and the second cover 620 has a protrusion 624 formed along the remaining side. As described above, the case in the broad sense includes the cover 600 including the second cover 620. That is, the entire circumference of the opening 312 is surrounded by the protrusions 314, 624 of the case in the broad sense. As shown in FIG. 8, the protrusion 314 protrudes from the outer surface of the front wall 310 by a height H314. As shown in FIG. 9, the protrusion 624 has a height H624 from the outer surface of the front wall 310. The height H314 and the height H624 are preferable to be same as each other. Because of the protrusions 314, 624 surrounding the opening 312 as described above, foreign matter is restricted from entering the case through a gap between the opening 312 and the arm 500.

FIG. 7 shows the protrusion 314, 624 viewed from a pad 200 side. The protrusion 314 of the case 300 includes an upper surface 314us forming an upper surface of the protrusion 314. In FIG. 7, the upper surface 314us slopes down leftward. However, the upper surface 314us may slope down rightward, or may not slope rightward or leftward.

Figure 10A:
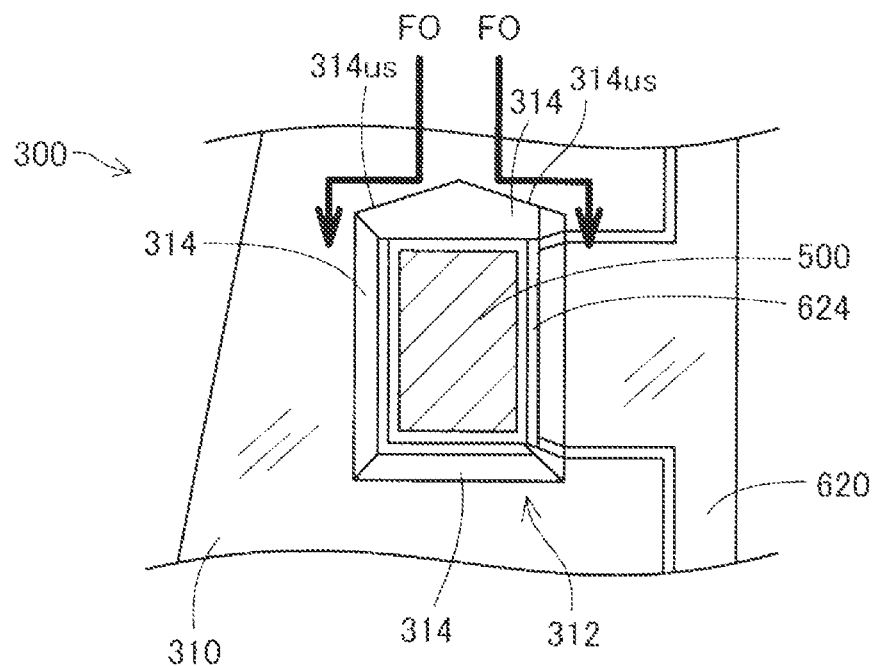
FIG. 10A is a schematic view illustrating a first modified upper surface of a protrusion surrounding an opening.
Figure 10B:
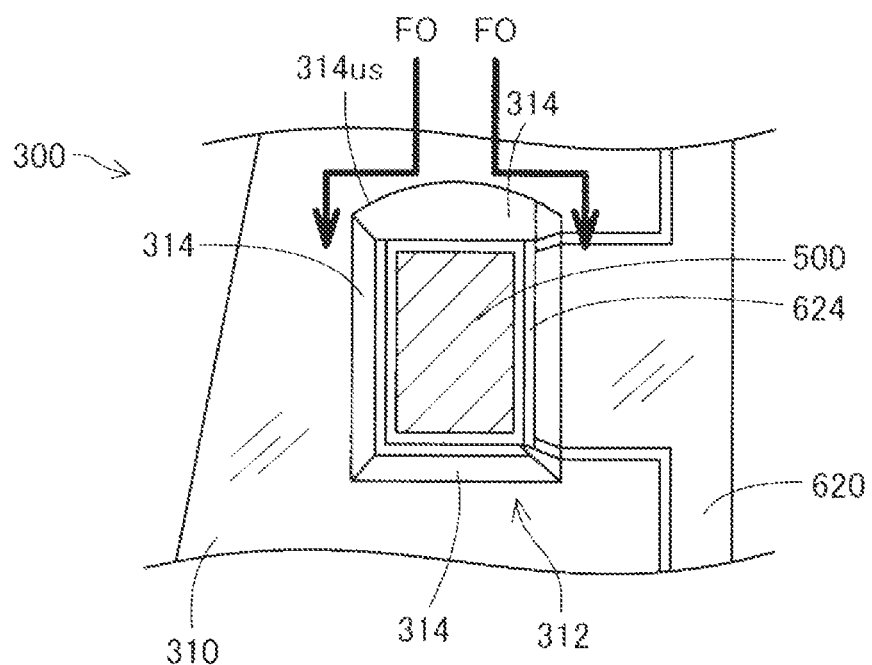
FIG. 10B is a schematic view illustrating a second modified upper surface of a protrusion surrounding an opening.

In FIG. 10A, the upper surface 314us of the protrusion 314 includes both an inclination portion which slopes down leftward and an inclination portion which slopes down rightward. In FIG. 10B, the upper surface 314us of the protrusion 314 has a curved surface protruding upward. The upper surface 314us formed in the curved shape is also considered to include both the inclination portion which slopes down leftward and the inclination portion which slopes down rightward, similarly to FIG. 10A.

As described with examples shown in FIGS. 7, 10A and 10B, the upper surface 314us of the protrusion 314 preferably includes the inclination portion which slopes down rightward or leftward. In this case, the foreign matter can be guided downward along the inclination of the upper surface 314us around the opening 312. That is, the foreign matter is restricted from entering the gap between the opening 312 and the arm 500.

As shown in FIG. 8, when the case 300 is viewed from the pad 200 side, the outer wall of the case 300 includes a periphery portion surrounding the opening 312. An upper peripheral surface 314up that is an upper part of the periphery portion faces the pad 200. In the example shown in FIG. 8, the upper peripheral surface 314up corresponds to a surface of the protrusion 314 provided around the opening 312. The upper peripheral surface may be the outer surface of the front wall 310 without the protrusion 314.

The upper peripheral surface 314up is preferred to be formed such that an angle 80 between the upper peripheral surface 314up and a side surface 520 of the arm 500 is larger than or equal to 90 degrees. Thereby, the foreign matter approaching the opening 312 is hit and bounced against the upper peripheral surface 314up of the opening 312 and the side surface 520 of the arm 500. Therefore, the foreign matter is restricted from entering the case 300 through the gap between the opening 312 and the arm 500. Here, the angle 80 is preferred to be larger than or equal to 90 degrees within an entire movable range of the arm 500 from the idle state to the full throttle state. The angle 80 is further preferred to be larger than 90 degrees and is most preferred to be in a range larger than or equal to 100 degrees and smaller than or equal to 140 degrees.

As shown in FIGS. 8 and 9, an inner wall surface 312i of the outer wall surrounding the opening 312 faces the side surface 520 of the arm 500. The inner wall surface 312i is preferred to be formed such that a gap between the inner wall surface 312i and the side surface 520 of the arm 500 is expanded toward an inside of the case 300. In FIGS. 8 and 9, each of angles 81 to 84 between the inner wall surface 312i and the side surface 520 of the arm 500 is larger than 0 degree. In addition, the gap between the inner wall surface 312i and the side surface 520 of the arm 500 is expanded toward the inside of the case 300. By employing the above structure, when the foreign matter is caught in the opening 312, the foreign matter is moved toward the inside of the case 300 through the opening 312 by operating the arm. As a result, the foreign matter is restricted from being stored at the opening 312.

The gap between the inner wall surface 312i and the side surface 520 of the arm 500 is preferred to be expanded toward the inside of the case 300 within the entire movable range from the idle state to the full throttle state.

Further, as shown in FIGS. 8 and 9, the side surface 520 of the arm 500 is preferred not to include a recess at a position facing the inner wall surface 312i. By employing the arm 500 without the recess at the side surface 520, the foreign matter is not stored at the side surface 520 of the arm 500. Therefore, when the arm 500 is operated to move toward the inside of the case 300, the foreign matter is restricted from entering the case 300.

Figure 11A:
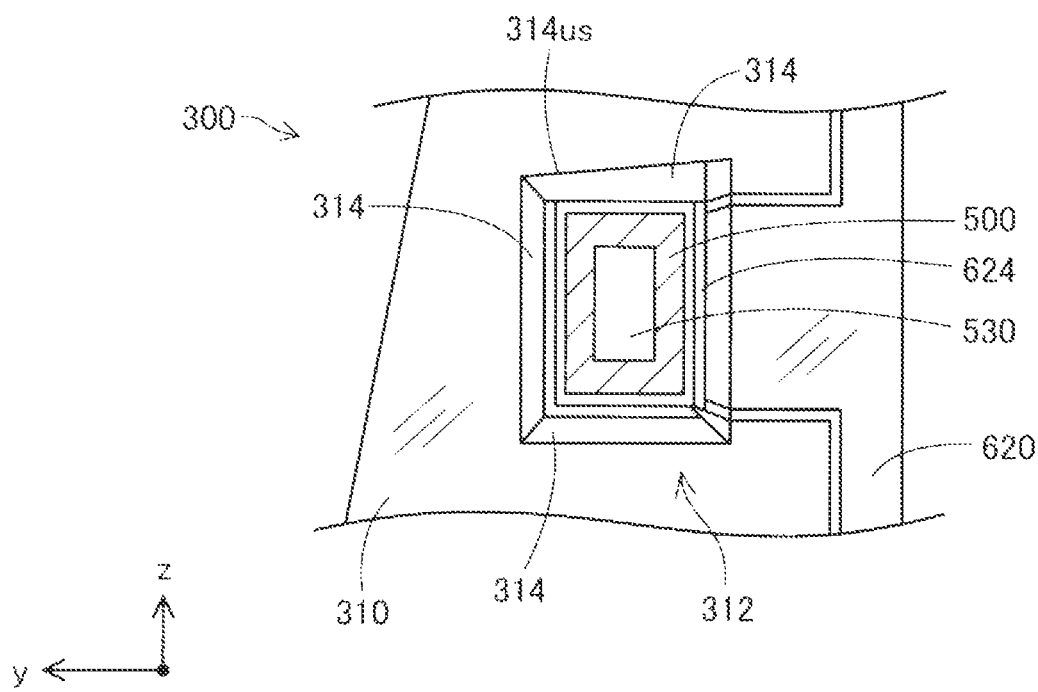
FIG. 11A is a schematic view illustrating a first modified arm including a cavity.
Figure 11B:
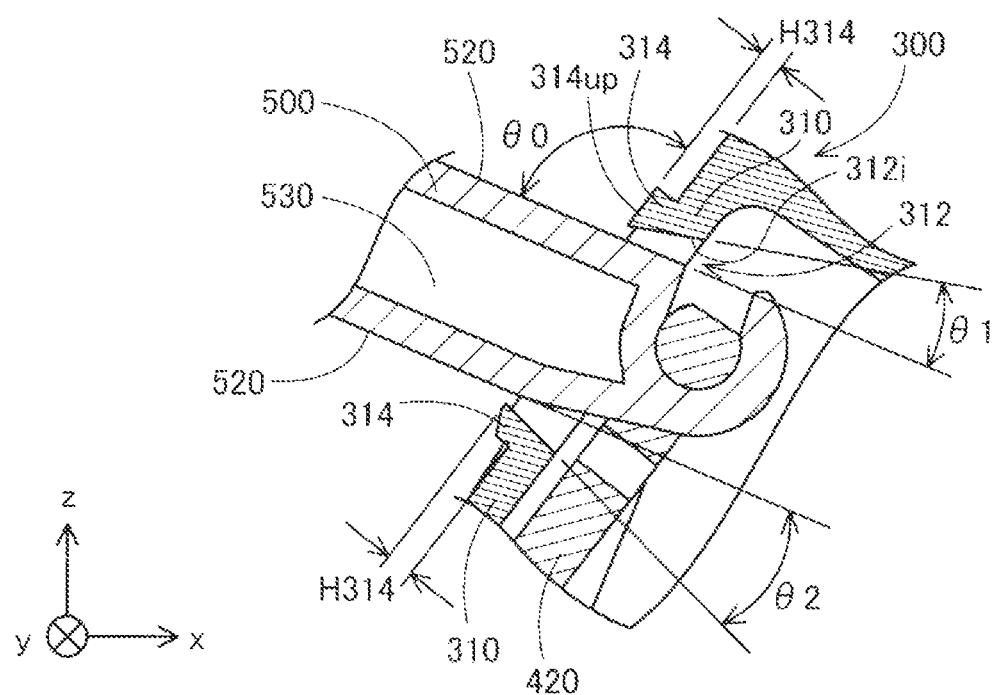
FIG. 11B is a cross-sectional view illustrating the first modified arm.

As shown in FIGS. 11A and 11B, a cavity 530 may be formed in the arm 500. In this case, the cavity 530 is preferred to be formed not to reach the side surface 520 of the arm 500 facing the inner wall surface 312i and preferred to be formed only inside the arm 500. Because of this, formability of the arm 500 is enhanced, and the foreign matter is restricted from entering the case 300.

Figure 12A:
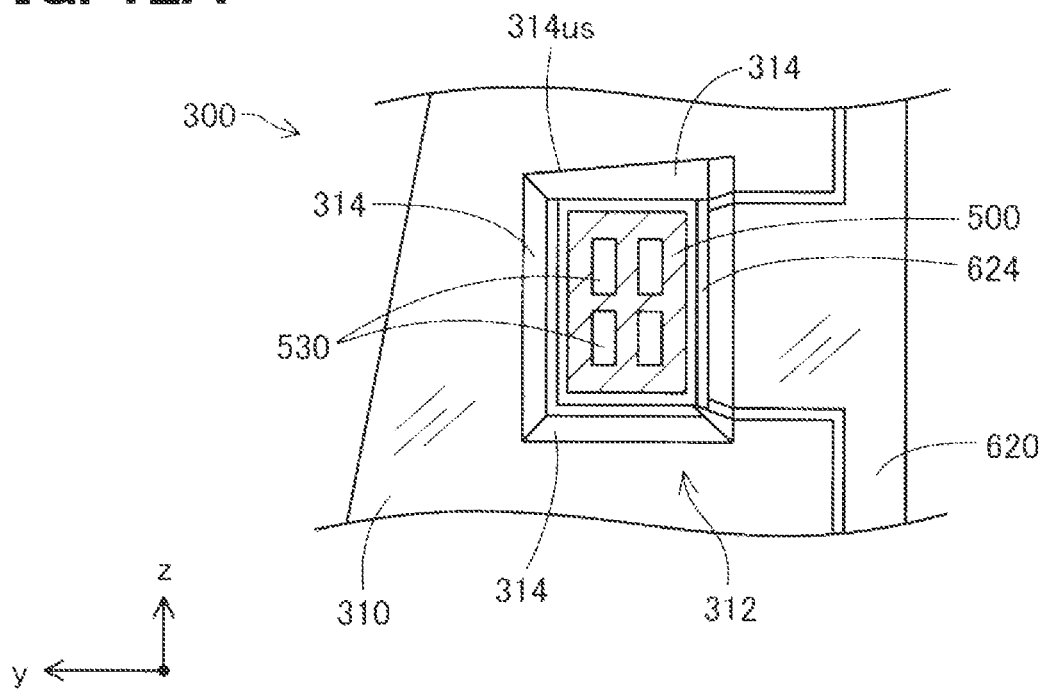
FIG. 12A is a schematic view illustrating a second modified arm including a cavity.
Figure 12B:
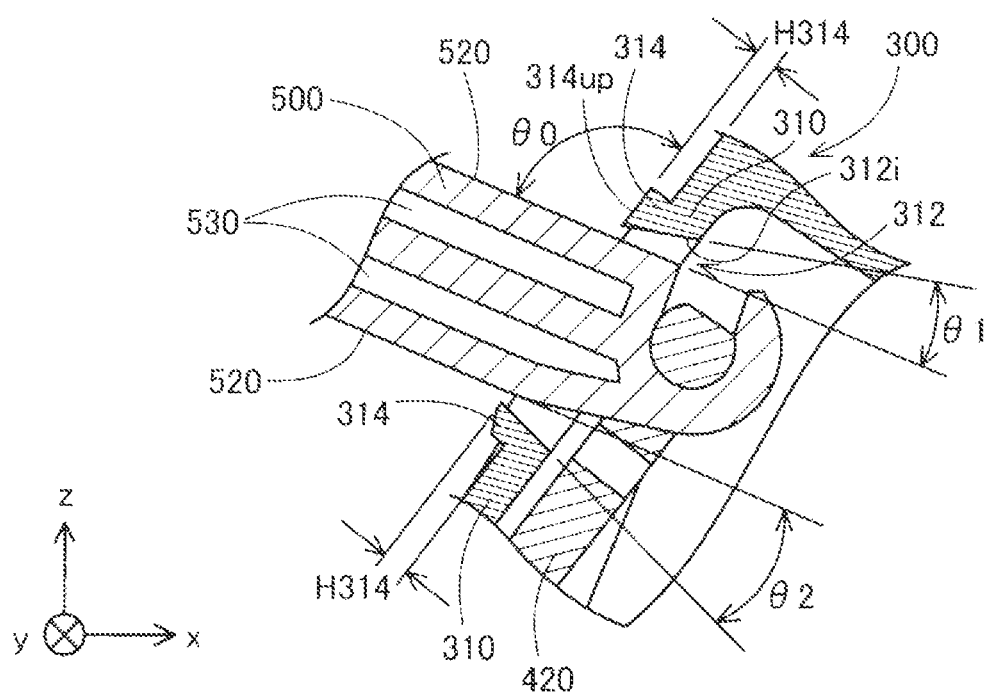
FIG. 12B is a cross-sectional view illustrating a third modified arm including a cavity.

As shown in FIGS. 12A and 12B, the cavity 530 of the arm 500 may be divided into multiple cavities in the arm 500. Because of this, strength and the formability of the arm 500 are enhanced, and the foreign matter is restricted from entering the case 300.

The various structural examples described above can be arbitrarily adopted independently and can also be adopted in any combination thereof.

The present disclosure should not be limited to the embodiments described above, and various other embodiments may be implemented without departing from the scope of the present disclosure. For example, in order to solve some or all of issues in the present disclosure, or to achieve some or all effects in the present disclosure, the technical features in the embodiments can be replaced or combined as appropriate. In addition, if the technical feature is not described as essential in the present specification, the technical feature may be omitted as appropriate.

What is claimed is:

1. An accelerator device having an organ structure comprising:
   a pad configured to be pressed by a driver;
   a case configured to be attached to a vehicle body;
   an inside movable mechanism housed in the case; and
   an arm that passes through an opening formed in an outer wall of the case and connects the pad to the inside movable mechanism, wherein
   the outer wall has a periphery portion surrounding the opening,
   the periphery portion of the outer wall includes an upper peripheral surface that is an upper part of the periphery portion facing the pad, when the case is viewed from the pad, and
   an angle between the upper peripheral surface and a side surface of the arm is larger than 90 degrees.

2. The accelerator device according to claim 1, wherein the arm has a rectangle shape in a cross section,
   an entire circumference of the opening is surrounded by a protrusion protruding toward the pad, and
   the protrusion includes an upper surface, and the upper surface has an inclination portion that slopes down rightward or leftward, when viewed from the pad.

3. The accelerator device according to claim 1, wherein the angle between the upper peripheral surface and the side surface of the arm is larger than 90 degrees within an entire movable range from an idle state to a full throttle state.

4. An accelerator device having an organ structure comprising:
   a pad configured to be pressed by a driver;
   a case configured to be attached to a vehicle body;
   an inside movable mechanism housed in the case; and
   an arm that passes through an opening formed in an outer wall of the case and connects the pad to the inside movable mechanism, wherein
   an inner wall surface of the opening faces a side surface of the arm, an entire circumference of the inner wall surface is expanded toward the inside of the case, and a gap between the inner wall surface and the side surface of the arm is expanded toward an inside of the case over the entire circumference of the inner wall surface.

5. The accelerator device according to claim 4, wherein the gap between the inner wall surface and the side surface of the arm is expanded toward the inside of the case within an entire movable range from an idle state to a full throttle state.

6. The accelerator device according to claim 4, wherein the arm has a rectangle shape in a cross section,
   an entire circumference of the opening is surrounded by a protrusion protruding toward the pad, and
   the protrusion includes an upper surface, and the upper surface has an inclination portion that slopes down rightward or leftward, when viewed from the pad.

7. An accelerator device having an organ structure comprising:
   a pad configured to be pressed by a driver;
   a case configured to be attached to a vehicle body;
   an inside movable mechanism housed in the case; and
   an arm that passes through an opening formed in an outer wall of the case and connects the pad to the inside movable mechanism, wherein
   the arm includes a side surface without a recess at a position facing an inner wall surface of the opening,
   a cavity is formed inside the arm not to reach the side surface facing the inner wall surface of the opening; and
   the cavity is one of a plurality of cavities inside the arm.

8. The accelerator device according to claim 7, wherein the arm has a rectangle shape in a cross section,
   an entire circumference of the opening is surrounded by a protrusion protruding toward the pad, and
   the protrusion includes an upper surface, and the upper surface has an inclination portion that slopes down rightward or leftward, when viewed from the pad.

* * * * *